(No Model.)
R. E. EVENDEN.
CENTRIFUGAL CHURN.
No. 551,668. Patented Dec. 17, 1895.
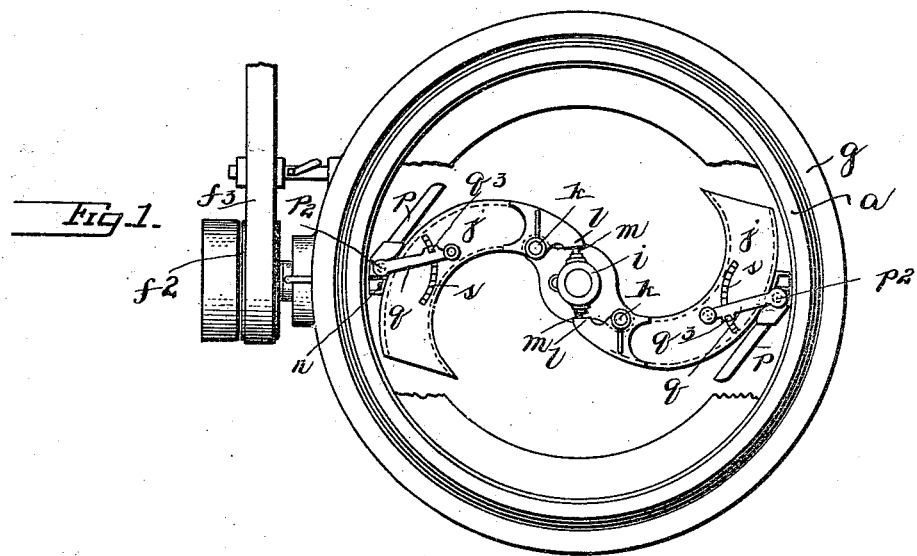
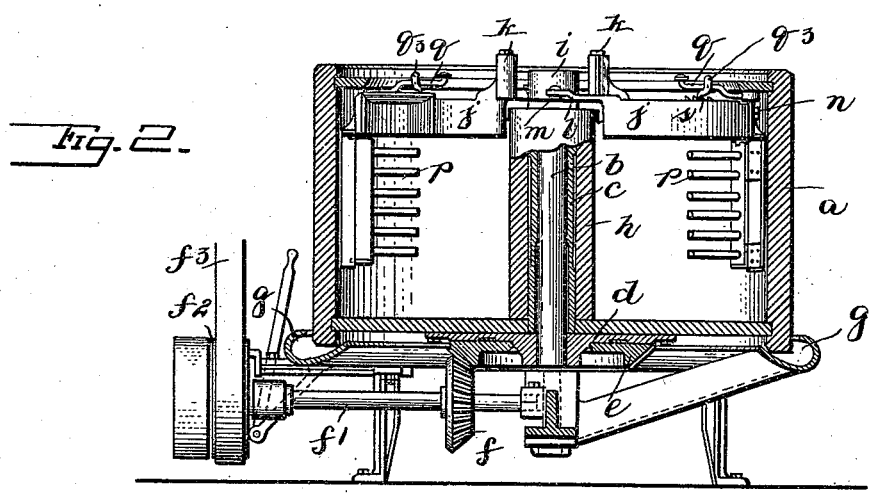
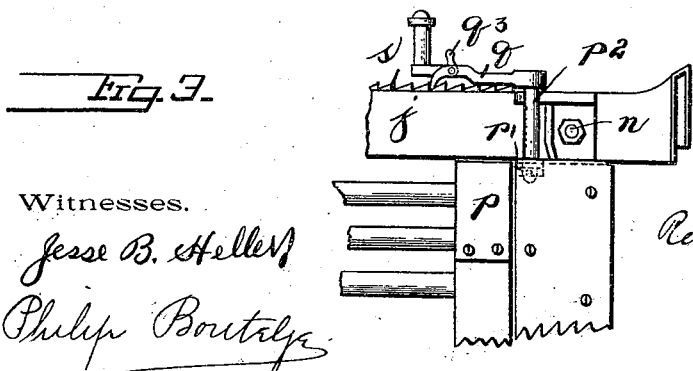
Witnesses.
Jesse B. Heller
Philip Boutely
Inventor.
Robert Edward Evenden
J. G. Harding
Attorney.

UNITED STATES PATENT OFFICE.

ROBERT EDWARD EVENDEN, OF HEATON, VICTORIA, ASSIGNOR TO THE AKTIEBOLAGET SEPARATOR, OF STOCKHOLM, SWEDEN.

CENTRIFUGAL CHURN.

SPECIFICATION forming part of Letters Patent No. 551,668, dated December 17, 1895.

Application filed June 25, 1895. Serial No. 553,969. (No model.)

*To all whom it may concern:*

Be it known that I, ROBERT EDWARD EVENDEN, a subject of the Queen of England, residing at Heaton, North Coburg, in the Colony of Victoria, Australia, have invented certain new and useful Improvements in Centrifugal Churns; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain arrangements or improvements in centrifugal churns, which consist of a vessel rotating about a vertical shaft, and in which vessel there are located shafts or diverters which do not rotate with the vessel, and against which the cream mass is thrown, whereby a rapid division of the butter globules and milk is effected.

I will now describe the embodiment of my invention as illustrated in the accompanying drawings, and then point out the invention in the claims.

In the drawings, Figure 1 is a plan view of my machine. Fig. 2 is a vertical section, and Fig. 3 is a detail view.

$a$ is the rotating vessel or churn, which rotates around a stationary vertical shaft $b$. Arranged concentrically with the shaft $b$ is a hollow hub or journal $c$, provided at its lower end with a projecting flange $d$, which is secured to the under side of the bottom of the churn and is connected with a bevel-wheel $e$. This bevel-wheel $e$ meshes with a bevel-wheel $f$ on the shaft $f'$. On the outer end of this shaft is a pulley $f^2$, driven by a belt $f^3$ from any desired source of power. This method of driving the machine may be varied to any extent desired and other mechanism may replace that just described.

$g$ is a receptacle for the churned milk. This receptacle is situated beneath the bottom of the churn and is for the purpose of carrying off the liquid left after the churning, which is allowed to escape from a valve located at the bottom of the churn and provided with a suitable strainer. (Not shown in the drawings.)

To protect the material in the churn from coming in contact with the metallic journal or hub $c$, I cover the same by surrounding it with a casing $h$, preferably of wood staves, which are tightened or secured against the bottom of the churn. On the upper end of the shaft $b$ I provide a holder $i$, which is keyed upon said shaft $b$, so that its position is fixed upon or secured to this holder $i$ by the vertical pivots $k$. $j$ are curved grate-channels having their bottom open and having a flared or bowl mouth, as shown in the drawings. These channels $j$ are pivotally secured upon the vertical pivots $k$ and have a projecting ear $l$ beyond the pivotal bearing. $m$ are a series of projections adjustable on the holder $i$. As may be seen from this construction, the movement of the channels upon their pivotal bearing is limited by the lug or ear $l$ striking its corresponding projection $m$ on the holder, so that the pivotal channels in the rotation of the machine are forced toward these projections and will occupy under that condition the position shown in the drawings, in which their outer or free end will reach near to the wall of the churn and the inlet will be in such position that it will return toward the direction of movement of the material which comes under the influence of these channels, will follow the course of the channels, and be moved toward the center to be then thrown again out against the periphery, these channels being, as shown, curved channels. To the exterior of these channels are secured the diverters, each of which consists of two vertical plates rigidly or fixedly secured to the outside of the channel, as shown, by means of screws $n$. (See Fig. 3.) These plates conform in shape to the churn-wall, so that they remain close to the churn-wall. The inner side of these plates is in a tangent plane. Between these plates and projecting from them are fastened the grates $p$ on a rod $p'$ which is hinged or secured to the plates, at $p^2$. This hinged rod can be moved so as to adjust in certain positions the plates $p$ by means of the lever connection $p^3$, which is connected to the crank $q$, which crank has connected with it a pawl $q^3$ adapted to engage with the fixed segment $s$ on the top of the channel *j*. By these means the plates may be, according to the quality of the cream, at any time during the churning, brought to occupy the position most desirable for the working of the cream, and the resistance offered to the rotating mass may be greater or smaller, and thus the cream globules may be more or less worked.

It is evident that if desired more than two channels *j*, with appurtenant grates, may be used, and in certain cases it may be sufficient to have only one channel with a grate.

I do not intend to limit myself to any particular connection or means for moving or holding the position of the grates.

Having now fully described my invention, what I claim, and desire to protect by Letters Patent, is—

1. In a centrifugal churn in combination with a rotatable vessel and a channel pivotally secured within said vessel adapted to have a swinging movement in the operation of said churn, and means to limit the movement of said channel upon its pivotal connection.

2. In a centrifugal churn in combination with a rotatable vessel and a channel pivotally secured within said vessel, and means to limit, and vary the limit of movement of said channel upon its pivotal connection.

3. In a centrifugal churn in combination with a rotatable drum and a curved channel one end of which is at or near the periphery and the other pivotally secured near the center of the vessel, said channel being adapted to have a swinging movement in the operation of said churn, and means to limit the movement of said channel upon its pivotal connection.

4. In a centrifugal churn in combination with a rotatable drum and a curved channel one end of which is at or near the periphery and the other pivotally secured near the center of the vessel, and means to limit, and vary the limit of movement of said channel upon its pivotal connection.

5. In a centrifugal churn, the combination with a rotatable vessel, of a fixed pivotal support within said vessel near the center, a channel pivoted on said support having an ear or projection beyond said pivotal point, and an adjustable stop in line of movement of said projection.

6. In a centrifugal churn, the combination with a rotatable vessel of a fixed pivotal support within said vessel near the center, a channel pivoted on said support having an ear or projection beyond said pivotal point, and an adjustable stop in line of movement of said projection, said channel having a flared or bell mouth.

7. In a centrifugal churn, the combination with a rotatable vessel of a non-rotatable plate, grates pivotally connected thereto, and means to move the grates upon their pivotal connection.

8. In a centrifugal churn, in combination, a rotatable vessel and a non-rotatable channel, plate or plates fixedly secured to the exterior of said channel, grates pivotally connected thereto, and means to move the grates upon their pivotal connection.

9. In a centrifugal churn, in combination, a rotatable drum and a non-rotatable curved channel, one end of which is at or near the periphery, and the other near the center of the vessel, plate or plates fixedly secured to the exterior of channel, grates pivotally connected thereto, and means to move the grates upon their pivotal connection.

10. In a centrifugal churn, in combination, a rotatable vessel, of a fixed pivotal support within said vessel near the center, a channel pivoted on said support having an ear or projection beyond said pivotal point, an adjustable stop in line of movement of said projection, plate or plates fixedly secured to the exterior of said channel, grates pivotally connected thereto, and means to move the grates upon their pivotal connection.

11. In centrifugal churns, the combination of a rotary vessel with stationary shares or diverters having the curved channel, and grates pivotally secured to said stationary shares or diverters, said grates being arranged so as to be adjustable to any required position.

In testimony whereof I affix my signature in presence of two witnesses.

ROBERT EDWARD EVENDEN.

Witnesses:
CARL ARBERG,
J. FR. HEDLUND.